United States Patent [19]

Cook

[11] 4,417,853
[45] Nov. 29, 1983

[54] WIND TURBINE SOFT AIRFOIL CONTROL SYSTEM AND METHOD

[75] Inventor: Gregory E. Cook, Warrenville, Ill.

[73] Assignee: Windpowered Machines Ltd., Livingston, Mont.

[21] Appl. No.: 234,963

[22] Filed: Feb. 17, 1981

[51] Int. Cl.³ .............................................. F03D 11/04
[52] U.S. Cl. .............................. 416/132 B; 416/142; 416/196 A; 416/DIG. 6
[58] Field of Search .......... 416/132 B, 240 A, 142 B, 416/189 A, 196 A, DIG. 4, DIG. 6

[56] References Cited

U.S. PATENT DOCUMENTS

| 282,122 | 7/1883 | Schramm | 416/142 B X |
| 548,171 | 10/1895 | Atwood | 416/189 A X |
| 677,747 | 7/1901 | Sterzing | 416/189 A X |
| 835,667 | 11/1906 | Donnelly | 416/132 B |
| 1,334,485 | 3/1920 | Clipfell | 416/189 A X |
| 1,417,000 | 5/1922 | Vogt et al. | 416/165 X |
| 1,483,301 | 2/1924 | Halkias | 416/DIG. 4 |
| 3,835,804 | 9/1974 | Jackson | 416/132 B X |
| 4,061,101 | 12/1977 | Cook | 416/240 A X |
| 4,116,152 | 9/1978 | Larsson | 416/132 B X |
| 4,149,482 | 4/1979 | Hoyt | 416/240 A X |

FOREIGN PATENT DOCUMENTS

| 211360 | 2/1956 | Australia | 416/196 A |
| 371459 | 3/1923 | Fed. Rep. of Germany | 416/DIG. 4 |
| 2642570 | 3/1978 | Fed. Rep. of Germany | 416/DIG. 4 |
| 1036341 | 9/1953 | France | 416/189 A |

*Primary Examiner*—Everette A. Powell, Jr.
*Attorney, Agent, or Firm*—Jacques M. Dulin

[57] ABSTRACT

Apparatus for furling, unfurling, and controlling a flexible airfoil for use in connection with a wind turbine wheel, comprising a rotatably mounted spindle journaled at one of its ends (the head end) to the hub of a wind turbine wheel, and at its other end (the foot end) in a foot plate bracket adjacent the rim of the wheel. The bracket is attached to a diametral bracing cable, and a soft airfoil is furled on the spindle. The foot plate is rotatably mounted so that the spindle foot can swing through a small arc about a centerline defined by the outer end of the cable. A "V"-shaped boom is rotatably secured to the foot plate and the bracing cable at its free ends such that the boom is pivotable with the spindle about a common axis spaced from the rotational axis of the spindle. A pulley is affixed to the outer, apex end of the boom. An outhaul line for furling and unfurling the soft airfoil is connected at one end to the clew of the soft airfoil, is threaded through the boom pulley, and its other end is secured to and wound about the spindle in a direction opposite the furling of the airfoil. A rotation means connected to the hub end of the spindle rotates the spindle, thus furling or unfurling the airfoil automatically by the self-winding/rewinding action of the outhaul line, thereby permitting rapid and precise adjustment of the soft airfoil in response to changing wind conditions. The upper end of the V-shaped boom pivots in a special connector assembly affixed to the intersection of the three major tension cables and provides precise adjustment of that intersection in three dimensions.

28 Claims, 19 Drawing Figures

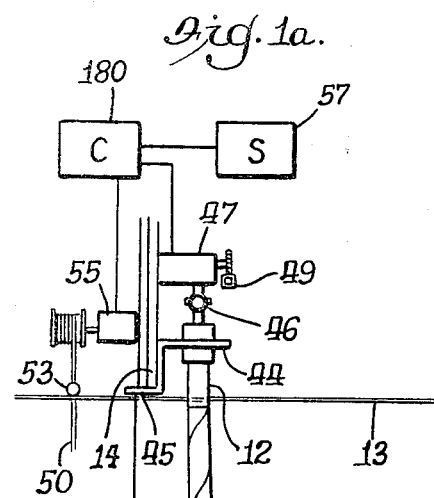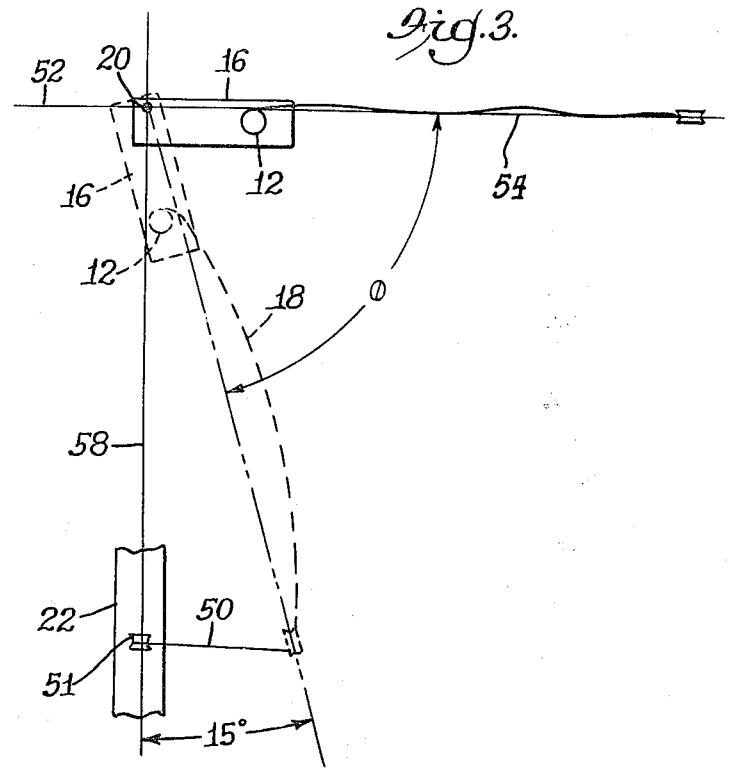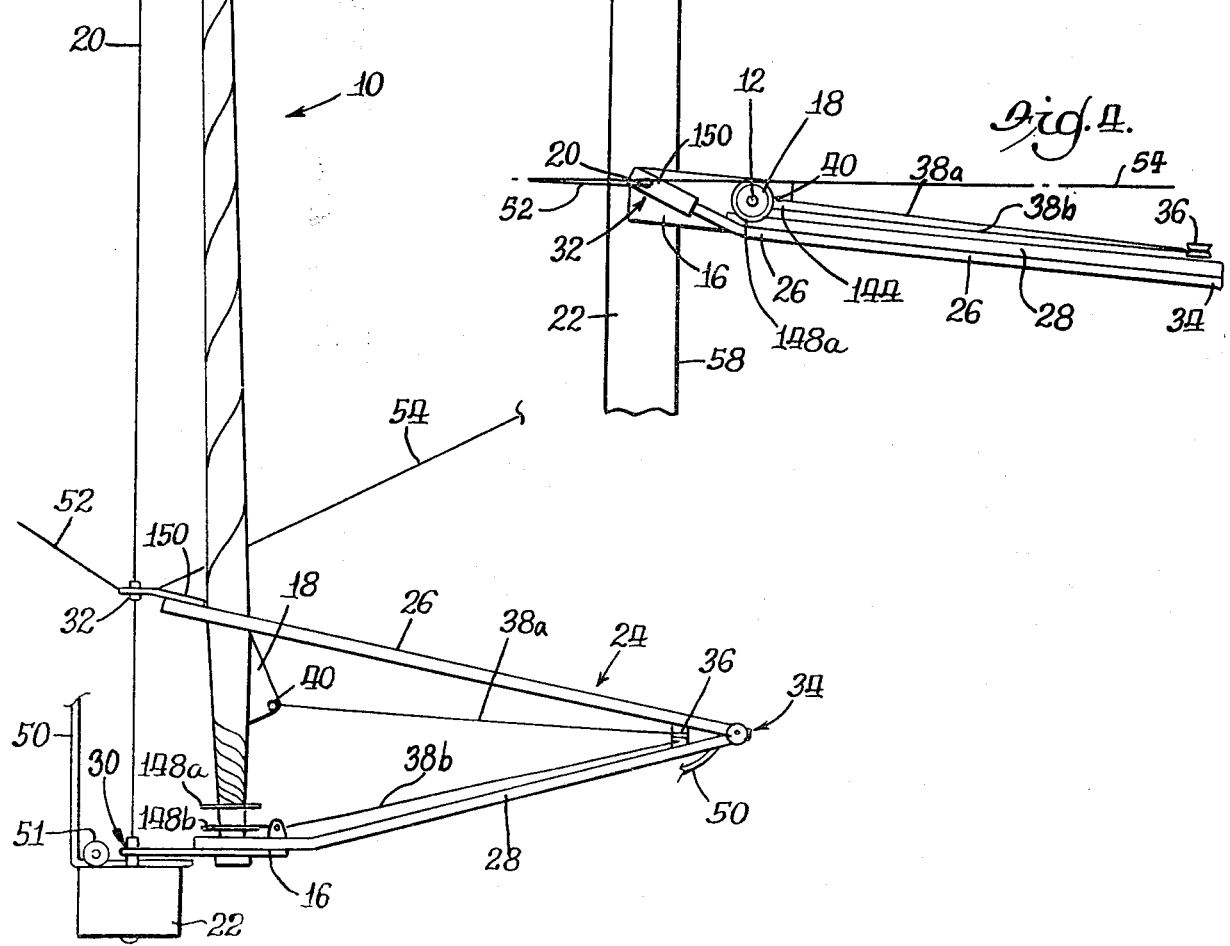

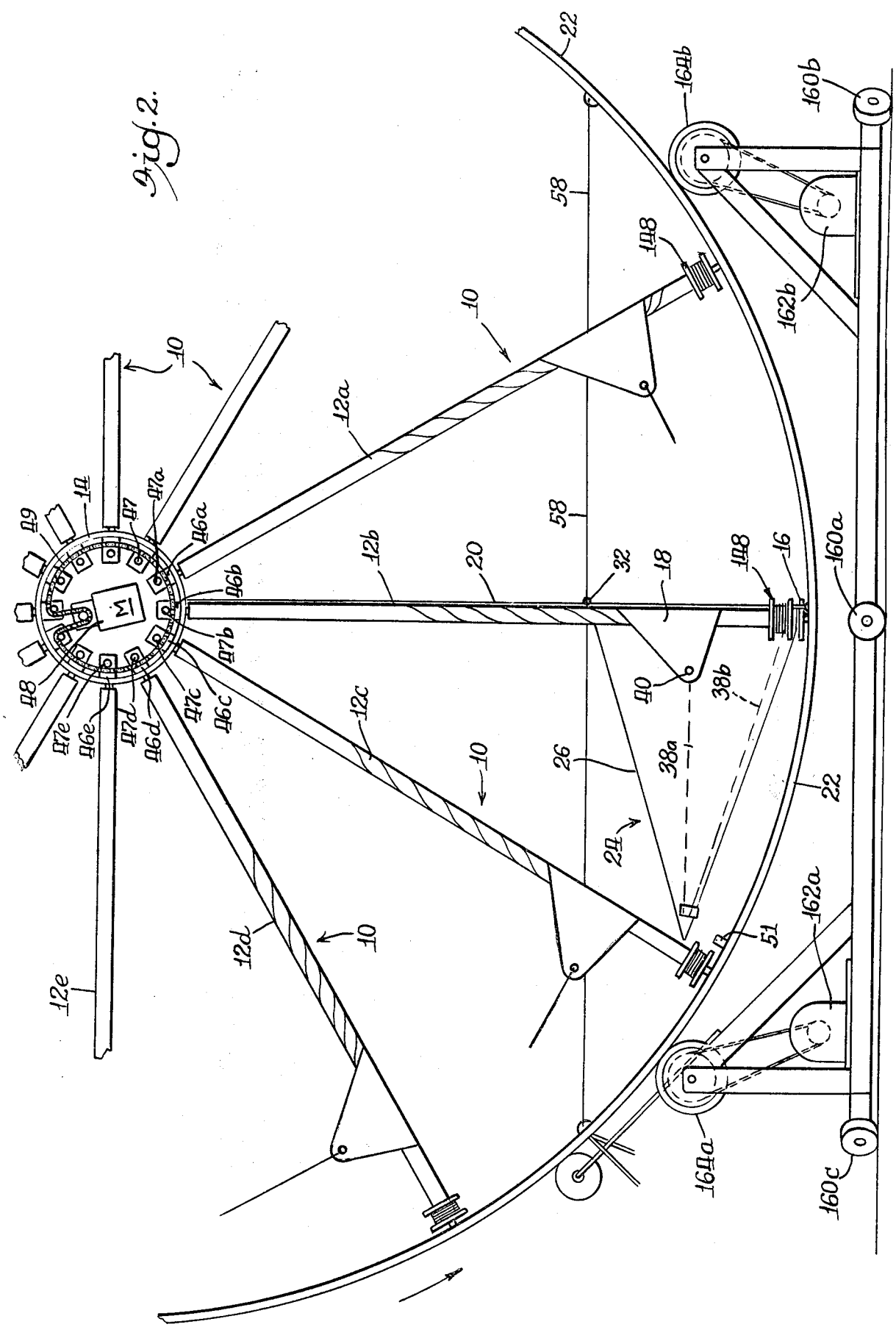

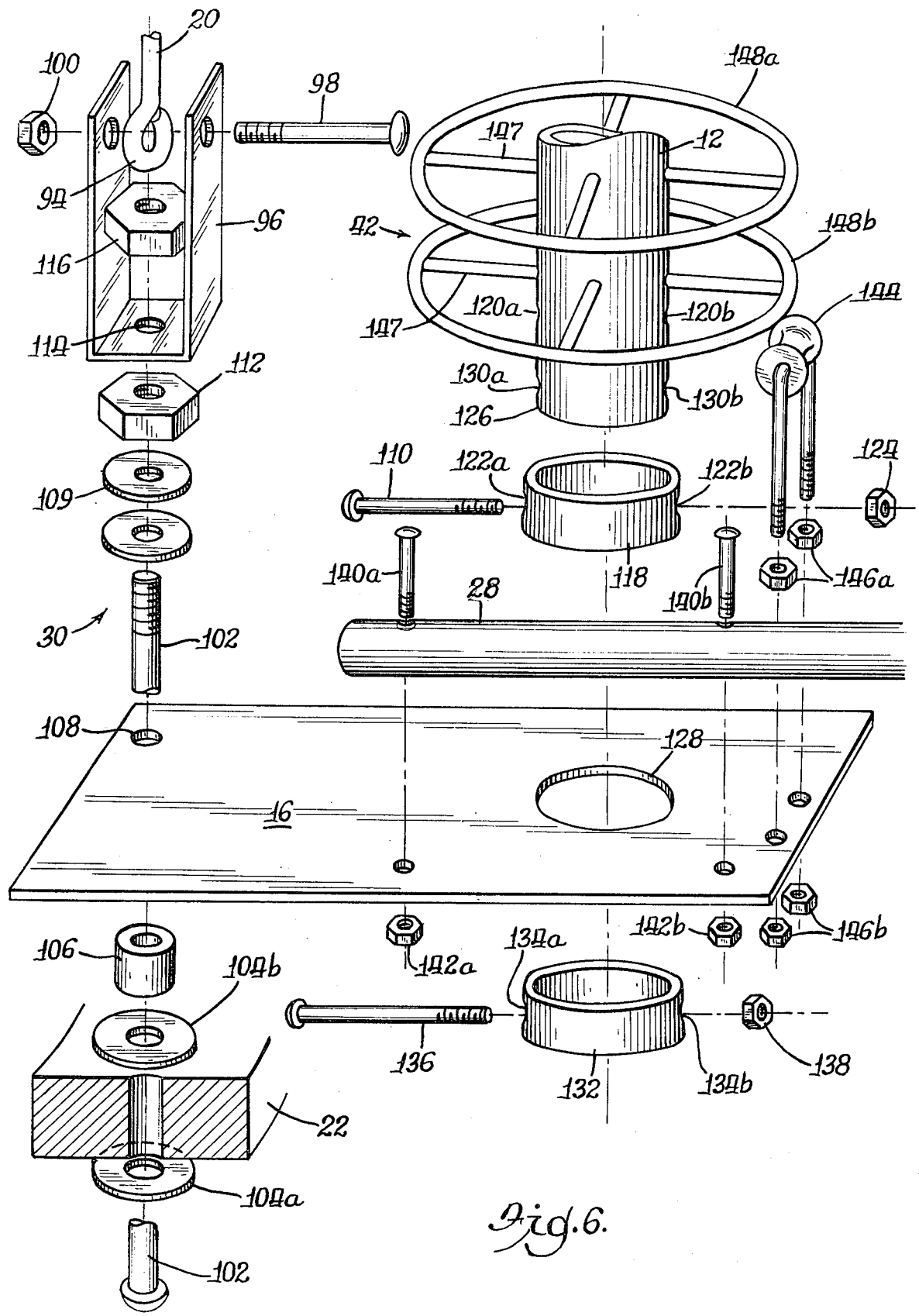

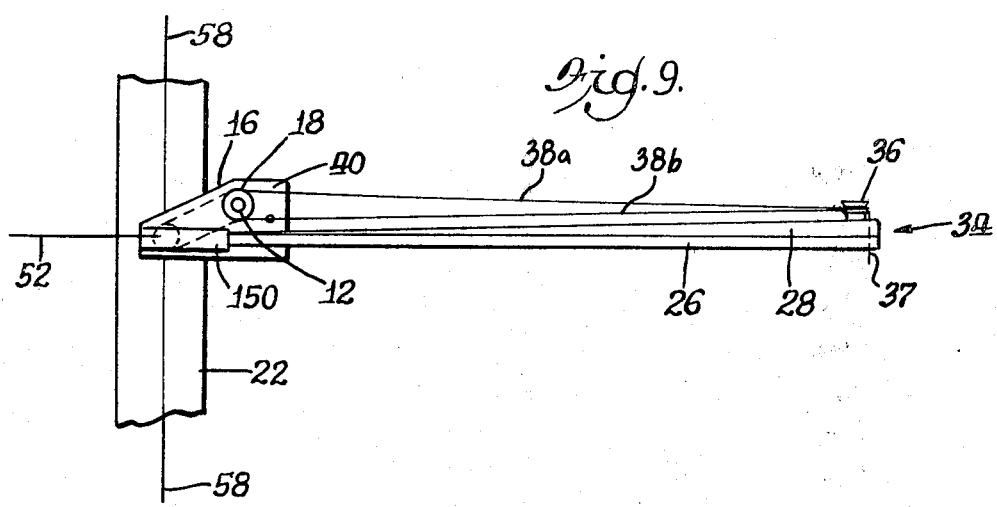
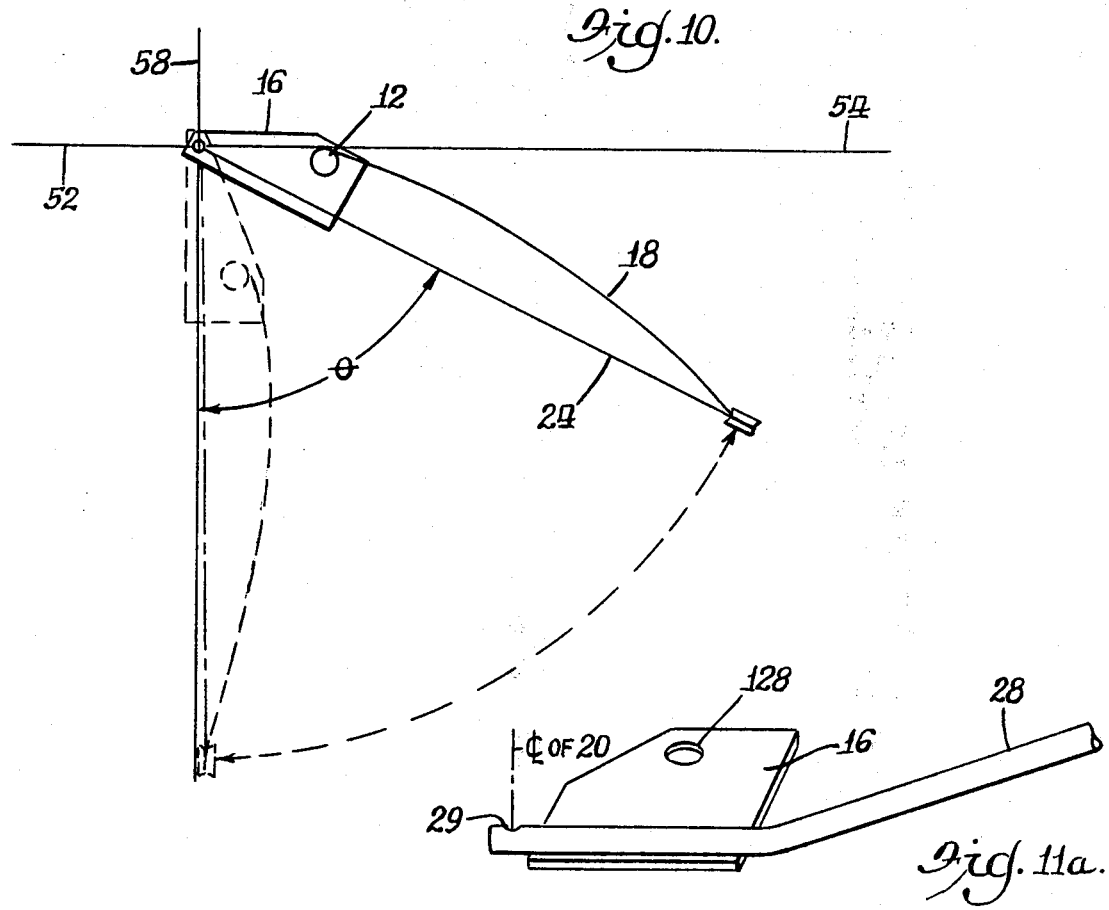
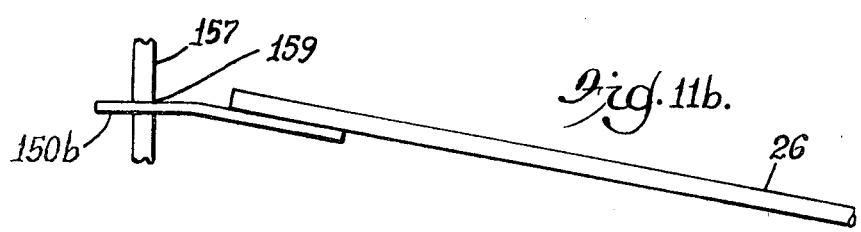

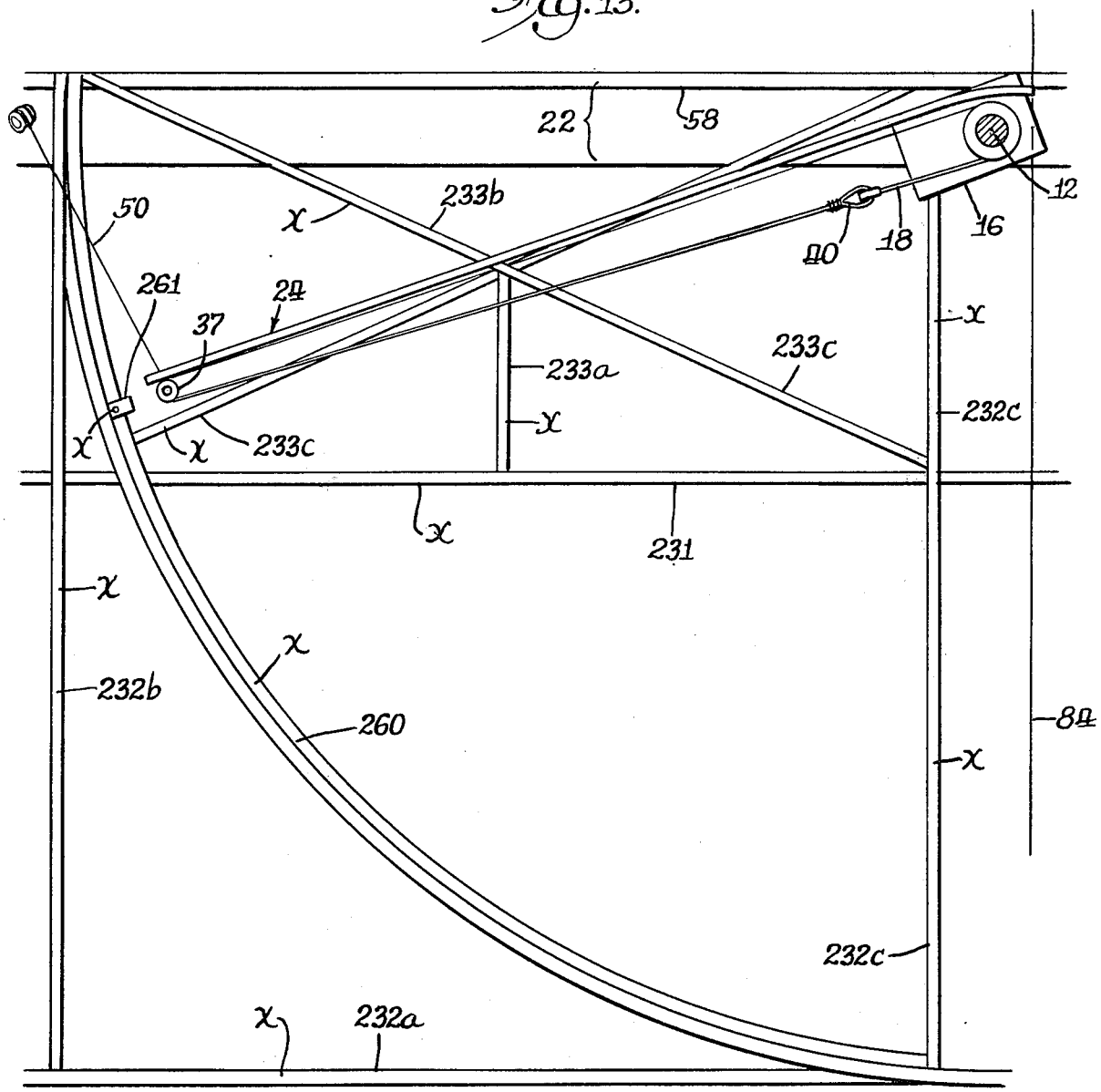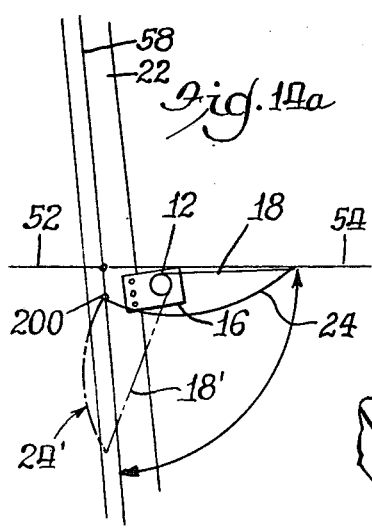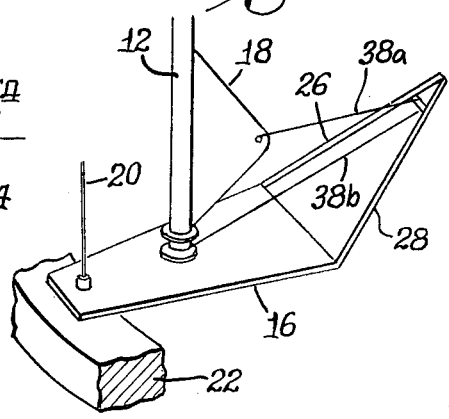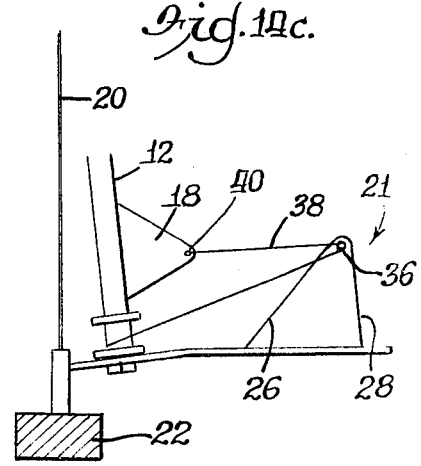

WIND TURBINE SOFT AIRFOIL CONTROL SYSTEM AND METHOD

CROSS REFERENCE TO RELATED APPLICATION

This application is related to my copending application Ser. No. 125,934 filed Mar. 3, 1980 and entitled "Wind Turbine and Method of Power Generation", now U.S. Pat. No. 4,350,895 issued Sept. 21, 1982, the disclosure of which is incorporated by reference herein.

BACKGROUND OF THE INVENTION

This invention relates to wind wheels or turbines and more particularly to apparatus for providing support and control of furlable soft airfoils used in wind turbines for power generation.

A wind turbine for extracting energy from the wind of the type which utilize soft airfoils (sails) requires some means be provided to extend and retract the airfoil or sail, as well as to control its position with respect to the wind. The usual sailboat arrangement is a boom retained at one end to a mast loaded in tension and compression when the sail is unfurled. The sail is traditionally stored on the boom when partly or fully furled, and the boom is controlled by a sheet reeved through pulleys secured to a deck and may be further supported by a vang secured to the deck. That sailboat system is not particularly adaptable to rotating wind turbines, principally because of the problem of furling and unfurling the sail from a plurality of booms spaced around the turbine. These booms in the wind turbine situation, would be in rotational motion and would require individual means to rotate each boom. This would create a prohibitively massive wind turbine structure. Further, there is no deck to which to secure the sheave (pulley) through which to pass a sheet for control of the boom angle with respect to the wind, or to prevent the boom from lifting under wind stress and spilling air out of the airfoil.

Prior attempts to provide a suitable rigging for soft airfoils in a wind wheel or turbine are shown in the U.S. Patents issued to McIlvaine, No. 242,211; Winge, No. 476,716; Lowe, No. 708,375; Bruneau, No. 704,507; Halladay, No. 138,648; Donnelly, No. 835,667; Wilson, No. 16,818 and German Pat. No. 2,642,570 of Schnitzer.

The patents to McIlvaine, Wilson, Halladay, Donnelly, and Lowe disclose airfoil apparatus for windmills or wheels that involve substantial bracing arrangements in relationship to the amount of airfoil exposed to the wind. The patent to Bruneau shows a mast and sail arrangement having a single support boom for multiple airfoils.

The patent to Winge illustrates a "paddle boat" type of airfoil arrangement in which the airfoils rotate in a plane parallel to the wind direction. Rectangular airfoils are supported by masts with only a spar instead of a boom. The airfoils are designed to be raised and lowered by means of an attached rope.

The German patent to Schnitzer discloses a furlable airfoil mounted on a wheel, but the wheel employs a plurality of heavy, non-compressible, radial mast members. Thus requiring substantial structure to support a small airfoil area. FIG. 9 of Schnitzer illustrates an arrangement of a boom connected to a mast member which is spaced from the spindle. It appears that when the boom is carrying a full sail, the degree to which the boom may pivot about the mast member is limited as the boom length is greater than that of the sail. If not constrained by other means, the boom will stretch and possibly rip the unfurled sail as it swings through a full arc. Much of the wind energy is expended in rotating the massive structures supporting the airfoils, and, accordingly, they do not provide an optimum means to extract energy from the wind. Their use is limited to providing supplemental energy or to single tasks such as pumping water from a well in the ground. Further, because of their mass and low sail/weight ratios, such prior devices require a relatively high threshold wind velocity for start-up and continuing operation. Because of their structural complexity, these prior devices appear unable to withstand a substantial gust of wind without collapsing or sail bursting/shredding.

My copending application entitled "Wind Turbine and Method of Power Generation" filed Mar. 3, 1980, Ser. No. 125,934, now U.S. Pat. No. 4,350,895 issued Sept. 21, 1982, the disclosure of which is incorporated by reference herein, provides a device and method which allows a substantial amount of the energy in the wind to be effectively utilized. It also is able to be used in a range of different wind speeds from light to heavy.

The improved soft airfoil system of this invention may be used in place of the rigging frames, tracks and travelers disclosed in my copending application, with a "V"-shaped boom and spindle mechanism which is lighter, simpler, less costly and permits better and more precise control of the airfoil position and area with respect to wind direction and strength, thus improving the efficiency of the wind turbine expressed in terms of unit airfoil area/unit weight.

THE INVENTION

OBJECTS OF THE INVENTION

It is a principal object of this invention to provide an improved, lightweight, economical support and control system for a soft airfoil used in connection with a wind turbine for power generation.

It is another object of the invention to provide an airfoil support system requiring a minimum of bracing supports, cables and pulleys for its operation.

It is another object of this invention to provide an airfoil support system that eliminates the need for various complex support structures, traveler and track assemblies for unfurling and setting the airfoil with respect to wind direction and wind speed, and for furling the sail.

It is another object of this invention to provide a plurality of spindle assemblies for such a wind turbine that are not loaded in tension or compression and are rotatable about their central axes by a common power source to automatically unfurl or furl the sail by a self-winding outhaul line.

It is an object of the invention to provide a rotatable spindle in an airfoil support system, which is pivotable about a support member at its outer end.

It is a further object of this invention to provide a means for rotating a spindle where said spindle is pivotable at one end about a support member.

It is another object of this invention to provide a boom assembly usable in connection with a rotatable spindle which is supportable without interfering with the operation of the spindle and which positions the airfoil with respect to the wind without stretching the airfoil.

It is a further object of the invention to provide a boom and spindle assembly which pivots with respect to the wind about a common axis, where that axis is removed from the rotational axis of the spindle.

It is another object to provide an improved soft airfoil support and control mechanism which has a specially adapted spindle and boom assembly for letting out and taking up an outhaul line for furling and unfurling of the airfoil and for correctly positioning the clew of the airfoil with respect to the wind direction.

It is another object of this invention to provide a special connector assembly for adjustably connecting the upper pivot point of the boom to the major cable(s) and which allows precise adjustment of the locus of that point in up to three dimensional axes.

It is another object of the invention to provide an improved soft airfoil support and control mechanism that has unexpectedly improved unit sail area/unit weight characteristics.

It is another object of the invention to provide an improved soft airfoil assembly that overcomes the problems of the prior art and permits construction of a wind turbine of such efficiency as makes them significantly practical as a source of energy.

BRIEF DESCRIPTION OF THE DRAWING

Further, objects, features and advantages will be made apparent from the following detailed description which is given with reference to the several views of the drawing, in which:

FIG. 1a is a side view of the airfoil spindle assembly of this invention showing the soft airfoil furled thereon and the special "V"-shaped control boom;

FIG. 2 is a front view showing approximately one quarter of a wind turbine showing a plurality of the spindle and boom assemblies mounted therein in operative relationship;

FIG. 3 is a schematic top view (radially outward from the turbine hub) showing the spindle and extended (unfurled) airfoil in a fully luffed position (solid lines), and in the operative (driving) position with wind-filled airfoil (dashed lines);

FIG. 4 is a schematic top view (radial view) of the spindle and the boom assembly in more detail;

FIG. 6 is an exploded perspective view of the outermost (foot or rim) end of the spindle and its connection to the rim of the wind turbine;

FIG. 9, comparable to the top view of FIG. 4, shows an alternative foot plate design which offsets the spindle from the line of the boom in an example of a wind turbine where the forestay is eliminated;

FIG. 10, comparable to the schematic diagram of FIG. 3, shows the included angle of swing, $\theta$, of the spindle and boom assembly which results from the alternative foot plate design where a forestay is included in the overall structure;

FIG. 11a shows an alternative version of the lower boom member and foot plate assembly in which the boom member itself is pivoted and an offset foot plate is affixed to it;

FIG. 11b shows an alternative version of the upper boom member and offset upper plate;

FIG. 13 shows bracing structures, travelers and track assemblies of the type useful in my aforementioned copending application which are eliminated by use of the present invention; and FIGS. 14a, 14b and 14c are views of alternative pivotal boom connections.

SUMMARY OF THE INVENTION

Figure 1B:
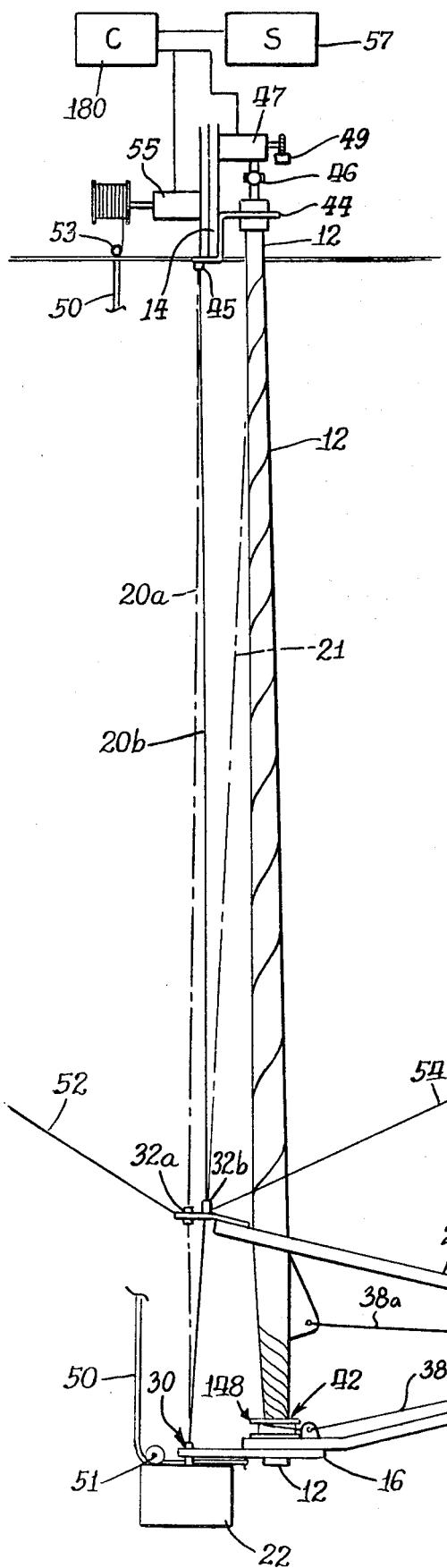
FIG. 1b is a side view as in FIG. 1a but showing in more detail how adjustment of the connector assembly of FIG. 7 brings the upper pivot point of the boom into alignment with the lower pivot point of the boom and the universal joint at the head end of the spindle assembly.

The improved soft airfoil support and control apparatus of this invention is particularly suitable for use with the wind turbine of my copending application identified above, and has application to other wind turbine apparatus.

In my copending application, spindles having soft airfoils secured thereto (sails) are journaled radially about a hub with their peripheral ends journaled on a circular rim of a wheel. The entire wheel assembly rests upon supporting power take-off wheels mounted upon a carriage. The wind wheel is constructed with a plurality of diametral brace cables in its plane of rotation, from which the hub structure is suspended. Thus, the brace cables support all the hub weight and the radial spindles are not support means. These spindles, being journaled at both ends, are not longitudinally loaded either in tension or compression and may be made of a lighter weight than a similarly loaded mast. In this respect, they differ vastly from the conventional uses of masts, and particularly sail-carrying masts on boats, which are heavily loaded in compression. Accordingly, the spindles in the wind turbine structure of the type of this invention and in my copending application are considered and treated differently from sailboat masts.

In the present invention, each spindle has a soft airfoil furled therearound, and is universally journaled at its head or radially central end in the hub of the wind turbine, and is journaled at its foot or peripheral end adjacent the rim of the wind turbine wheel. At its foot end the spindle is rotatably mounted in a foot plate which is pivotally connected to a diametral bracing cable. The plate pivots about the cable, allowing the foot of the spindle to swing through a small arc. The wheel hub assembly includes a common means, such as an electric motor, for rotating the spindles about their central axes. A universal joint is provided between the electric motor and spindle to allow for the spindle's rotation as it pivots about the brace cable.

Connected adjacent the foot of each spindle is a "V"-shaped boom assembly consisting of an upper boom support member and a lower boom member joined together at one end. The free end of the upper member is pivotally connected to the bracing cable, and the free end of the lower member is rigidly affixed to the pivotal foot plate. The point of joinder of the upper and lower booms provides a point to which the clew of the soft airfoil is drawn as it is unfurled from the spindle. The upper boom support member provides support to the boom assembly when stressed under a wind load. It prevents the lower boom member from lifting under such stress and spilling the wind out of the airfoil.

The boom assembly is attached to the diametral bracing cables so that it may pivot about the calbe with the foot end of the spindle but does not interfere with the rotation of the spindle. In an alternative embodiment, the lower boom member is replaced by a cable which originates at the foot plate, is secured to the extreme end of the upper boom member, and extends to the head end of the spindle. In either embodiment, the boom assembly and the spindle have the same pivotal axis thus preventing stretching or ripping of an unfurled airfoil as the boom and spindle are pivoted about the wind.

The upper boom member is mounted on the windward side of the soft airfoil so that as the airfoil fills and bellies out to leeward, there will be no interference with it from the boom member. The boom may be curved around the spindle to join the bracing cable, or, in the alternative, the entire boom arrangement may be offset from the spindle to provide the necessary space for the independent rotation of the spindle as the airfoil is unfurled and furled.

Secured to the joinder point of the upper and lower boom members is a pulley (sheave) through which an outhaul line is passed. The outhaul line is attached at one end to the clew of the furled airfoil, and is secured at its other end to a spool portion of the spindle foot. As the spindle is power rotated about its central axis in the same direction that the airfoil is unfurled about the spindle, the outhaul line will be wound on the spool spindle thereby pulling the clew of the airfoil towards the pulley on the apex of the boom assembly and unfurling the sail adjacent the boom. Rotation of the spindle in the opposite direction furls the airfoil about the spindle.

Once unfurled, the airfoil is oriented in the wind by controlling the position of the boom apex as it pivots about the diametrical brace cable. A line is attached to the outer point of the boom. This line passes through a sheave on the rim of the wheel and thence to a reel spool in the hub which is controlled by an electric motor. This line will provide further support to the wind loaded boom assembly.

Selected cable stays are secured to the diametral brace cable and turbine rim such that the boom assembly is constrained to pivot in an arc of approximately 90°, and in other alternate arrangements the boom can pivot in an arc greated than 90°. A release means may be supplied to allow the boom and airfoil to "luff" freely in the event of the sudden gusts which might destroy other wind turbine devices.

The pivot point of the upper boom member is rotatably secured to the diametral bracing cable, the back stay, forestay and crossbrace cable by means of a special connector assembly which clamps onto those cables and is adjustable therealong so that the pivot point can be precisely located to align it with the universal joint and the lower boom pivot point.

It is an important aspect of this invention that it combines a V-shaped boom structure with a rotatable soft airfoil-carrying spindle into a rigid unitary structural relationship, the whole of which assembly may rotate as a unit about a common centerline which is established independently of, and external to the spindle by the pivot points of the foot plate and the connector assembly in which the upper boom pivots. This permits the upper boom member to be attached to and pivoted about a point some small distance from the spindle, thereby permitting rotation of the spindle for purposes of unfurling and furling the soft airfoil, while yet maintaining the geometric relationship of the boom to the spindle and so providing full control of the soft airfoil. Additionally, while providing the desired control, it permits the spindle to be free of any longitudinal loading, either tensile or compressive.

The V-shaped boom allows for a lightweight yet structurally strong boom which does not need additional supports or stays connected to the rim or hub of the wheel to prevent its lifting when the airfoil is before the wind. Other boom shapes may be employed such as a boom having a bent section at the point where it joins the clew.

By virtue of the ability to control the location of the boom with respect to the wind and to control the amount of airfoil unfurled to the wind, a wind turbine utilizing this invention may be used in a large variety of wind situations from heavy to light winds. Also a constant turbine rotation may be established by the manipulation of the airfoil area and position.

This invention provides means whereby the furling and unfurling of the airfoils of a soft airfoil type wind turbine such as in my copending application, as well as in other types, may be achieved and controlled with lesser structure and mechanism than was previously possible, with concomitant reductions of cost and weight. This invention also permits the presentation of a large area of airfoil to the wind with a minimum of structure. Wind turbines utilizing this invention can commence power generation at lower wind speeds in contrast to other types which are too massive or so structured as to require higher wind speeds. This renders the device effective on a greater number of days in a given period requiring less use of supplemental energy systems, and over a wider geographical area into regions of lower ambient wind speeds.

DETAILED DESCRIPTION OF THE PREFERRED EMBODIMENT

The apparatus and method of this invention is described in more detail with reference to the drawings, it being understood that this description is by way of example and not by way of limitation of the principles of the invention.

Referring to FIGS. 1a and 2, the head end (centermost end) of airfoil assembly 10 is shown having spindle 12 connected to a portion of hub 14 of wind turbine 56. Spindle 12 is also connected at its opposite (foot end) to foot plate 16 and has sail 18 furled therearound. Spindle 12 is rotatably mounted (journaled) in plate 44 attached to hub structure 14 and in foot plate 16 such that spindle 12 may rotate about its central axis. Diametral brace cable 20 runs from the rim 22 through hub 14 and on through to the opposite rim, best seen in FIG. 12. A "V"-shaped boom assembly 24 is shown attached to foot plate 16 and diametral brace cable 20. Note airfoil spindle 12 is preferably canted outwardly of the rim 22 (downwind or leeward) to assure clearance of the brace cable, but the axis of the spindle may be parallel to, and spaced from, brace cable 20.

Boom assembly 24 includes upper boom member 26 and lower boom member 28. Lower boom member 28 is attached to foot plate 16 which in turn is rotatably journaled around brace cable 20 at connector assembly 30

(see FIG. 6) such that it may rotate about a centerline defined by diametral brace cable 20.

Figure 7:
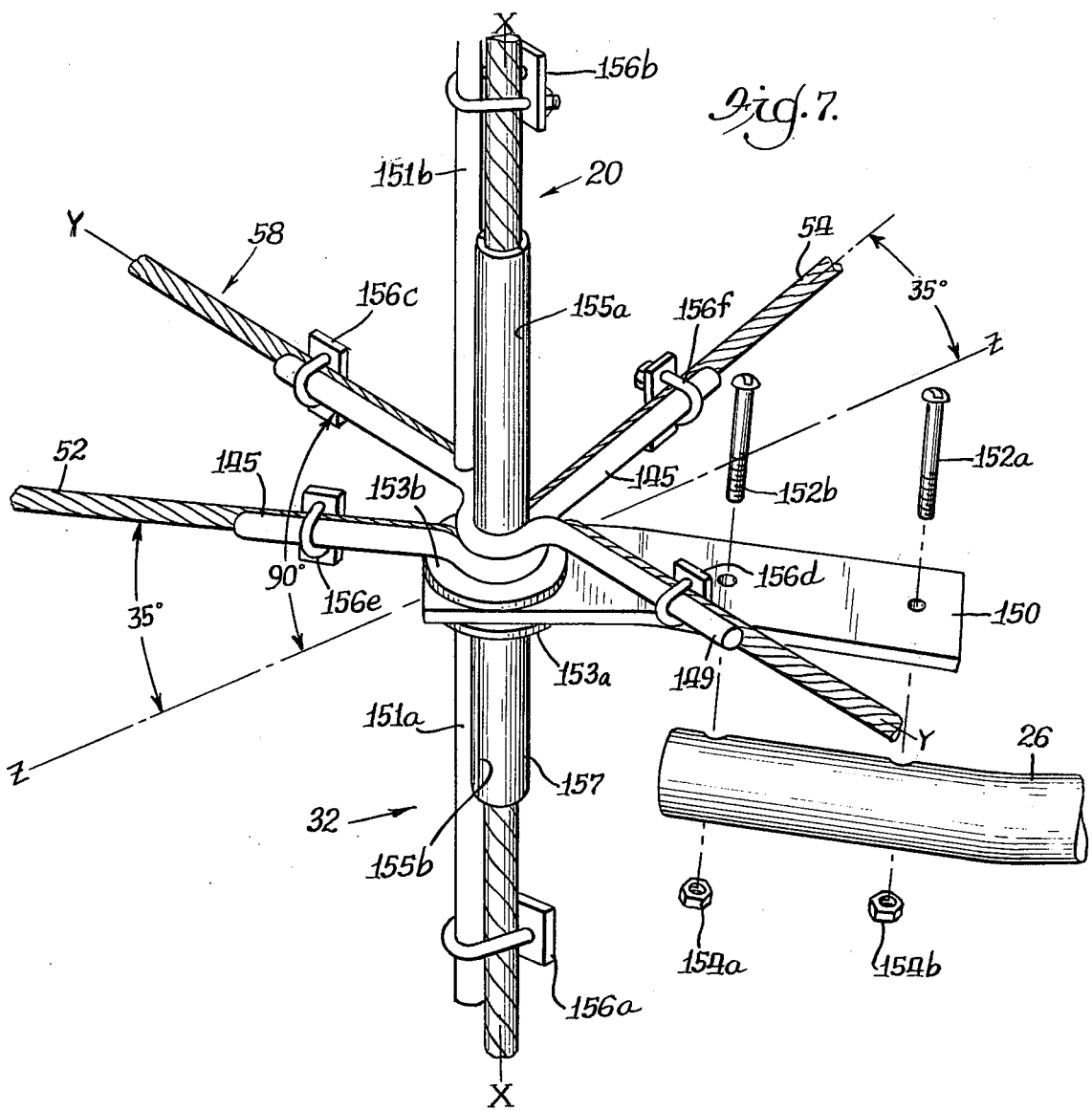
FIG. 7 is a partial exploded perspective view of the special connector assembly in which the upper leg of the "V"-shaped control boom pivots and its adjustable connection to the three main bracing cables.
Figure 8B:
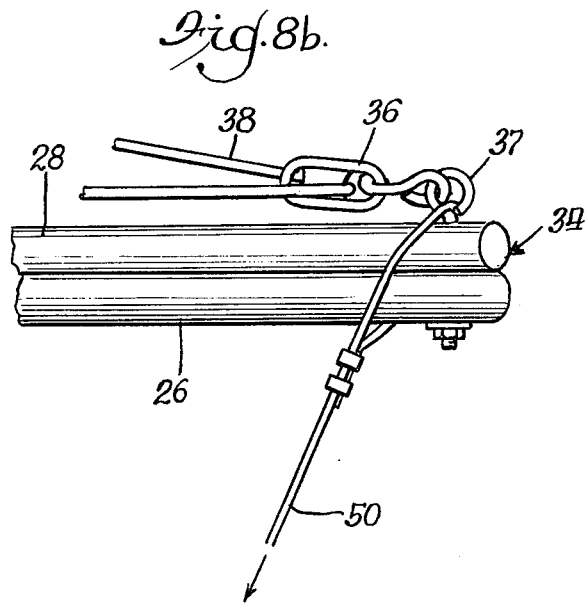
FIGS. 8a and 8b show a side view and a top view, respectively, of the point where the upper and lower boom legs connect at their apex and the position of the outhaul sheave.

Upper boom 26 is rotatably secured to diametral brace cable 20 by an adjustable connector assembly 32 (see FIG. 7). Upper boom member 26 joins lower boom member 28 at apex 34. Connected to apex 34 is pulley 36 having outhaul line 38 strung therethrough, as best seen in FIG. 8b. One end of outhaul line 38a is attached to sail 18 at clew 40. The other end of outhaul line 38b is attached to spindle 12 at spindle foot 42 between reel guides 148a, 148b.

Figure 5:
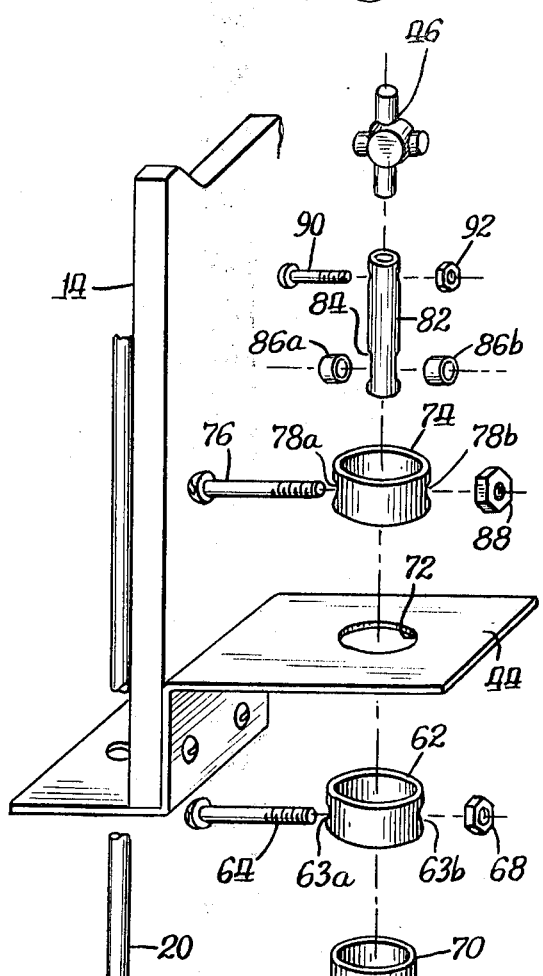
FIG. 5 is an exploded perspective view of the centermost (head) end of a spindle and its connection to the hub of the wind turbine.

Spindle 12 is rotatably journaled in plate 44 secured to hub bulkhead 14, and is connected to universal joint 46 which in turn is connected to a gear box 47 and motor 48 assembly (see FIGS. 2 and 5). Thus, when motor 48 is activated, power is transmitted through chain 49 via gear box 47 to universal 46 and thence to spindle 12. Spindle 12 then rotates in a desired direction about its central axis. As spindle 12 is rotated in the same direction that sail 18 is unfurled on spindle 12, outhaul line 38b is taken up at spindle foot reel assembly 42 by the rotation of spindle 12. Thus taken up, outhaul line 38 causes clew 40 to be pulled towards pulley 36 at apex 34. This action unfurls sail 18.

When spindle 12 is rotated by motor 48 in the opposite direction, a sail is furled onto spindle 12 with outhaul line 38 being unwound from spindle foot reel assembly 42. The outhaul line 38 is made of appropriate length to keep the proper tension and curvature in airfoil 18.

As best seen in FIGS. 4 and 7, in the preferred embodiment, upper boom member 26 is curved to clear the airfoil/spindle assembly 10 and not interfere with the furling or unfurling of sail 18. An alternate, offset foot plate is shown in FIGS. 9 and 10. Boom assembly 24 and foot plate 16 rotate about a centerline, which in the preferred embodiment is defined by diametral brace cable 20. When sail 18 is unfurled, this rotation about diametral brace cable 20 permits boom assembly 24 to be positioned for best angle of attack to the wind, which in FIGS. 1, 3, 4, 9 and 10 is from the left.

Figure 8A:
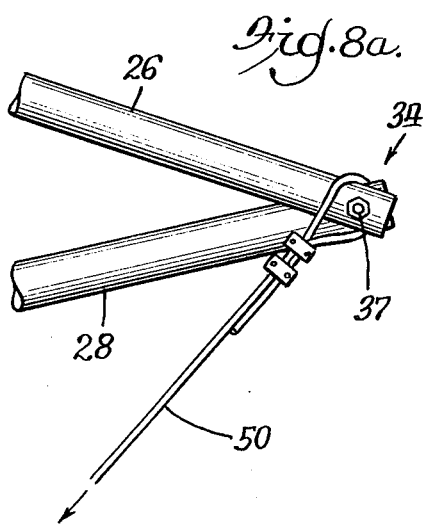

A sheet (line) 50 is attached to the apex 34 of boom assembly 24 (best seen in FIGS. 8a and 8b). Sheet 50 passes through sheave 51 on rim 22 of the wind turbine and then passes radially to the hub 14 via sheave 53 where there is a power driven capstan/reel assembly 55 for take-up and pay-out of the line 50. As the sail is under lateral force (counterclockwise in FIG. 3), the pay-out or take-up of line 50 automatically sets the airfoil into the wind at the appropriate angle. Each of the many spindles 12 of a wind turbine of this invention may be independently driven, or coupled together as in the preferred embodiment of FIG. 2 when motor 48 drives all the spindles via continuous chain 49. Wind speed, wind direction and humidity sensors 57 may be mounted upstream of the wheel and information therefrom processed by computer 180 with feedback to motors 48 and 55 to give precise control of the set and exposure (area) of the airfoils, rotational velocity of the wheel and the like in continuous response to varying wind conditions to provide most efficient operation of the wind turbine 56.

As best seen in FIGS. 3, 4, 9 and 10, forestay cable 54, which is connected to diametral brace cable 20 at connector 32, forms a restraint of the angle θ through which boom assembly 24 may swing.

Referring now to FIG. 2, wind turbine 56 is shown having several airfoil assemblies 10 located thereon. Several spindles 12 are shown connected to wheel rim 22 between foot plates 16 and hub 14. Hub 14 of wind turbine 56 has motor 48 and gear boxes 47a, b, c, etc. contained therein which are in turn connected to universal joints 46a, b, c, etc.

Figure 12:
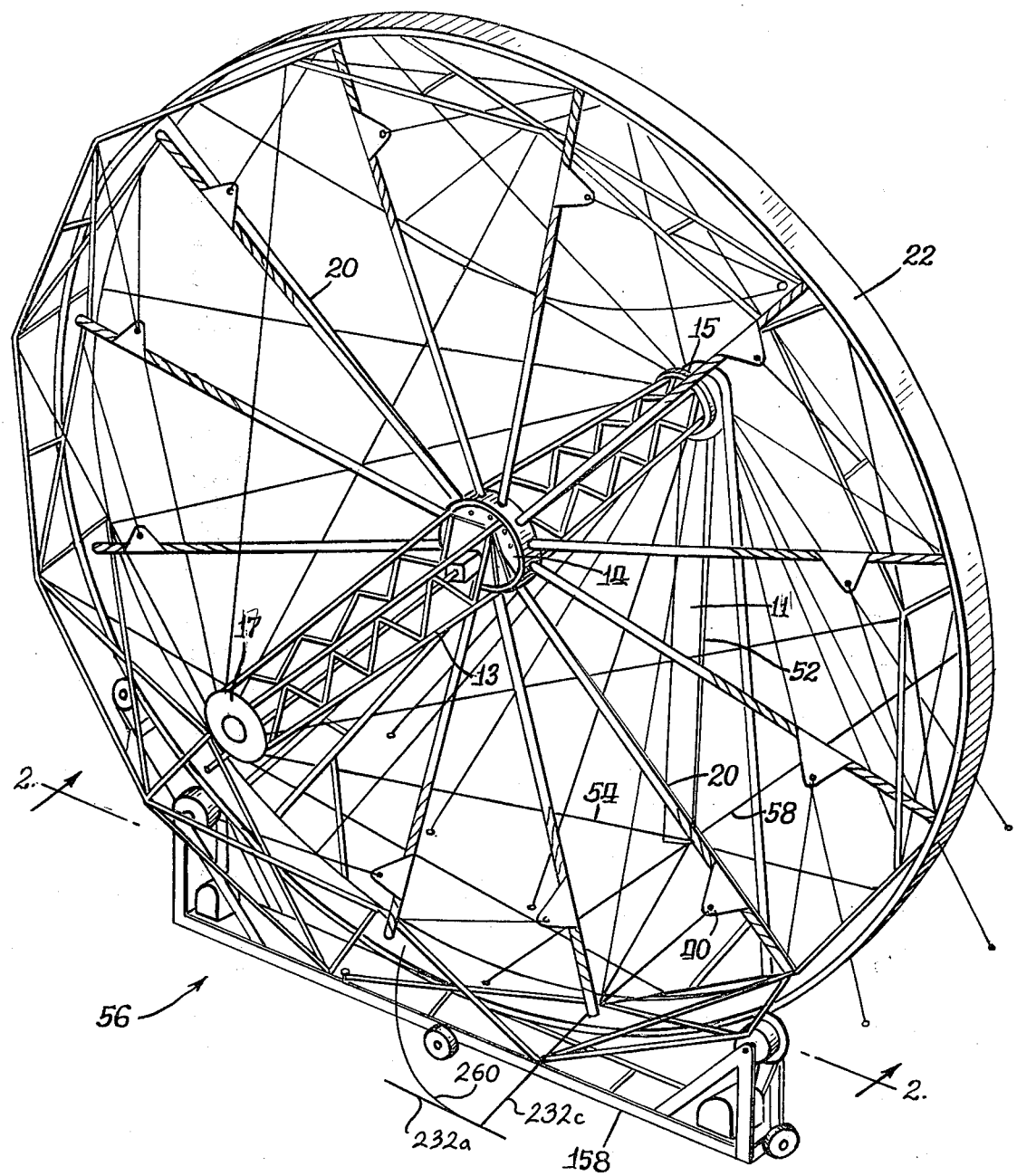
FIG. 12 shows in front three-quarters perspective the spindle and traveler arrangement of the wind turbine of my aforementioned copending application.

Upon activation of motor 48, chain 49 drives gear boxes 47a, b, c, etc. which in turn impart a rotating force to spindles 12a, b, c. These spindles rotate and collectively furl or unfurl sails 18 wrapped thereon. Diametral brace cable 20 is shown running approximately parallel to spindle 12. Cross brace 58 is shown running as a chord from one point of rim 22 to another point. Connector assembly 32 is shown intersecting cross brace 58 for spindle 12b. Cross brace 58 forms one of the constraints against which boom assembly 24 may pivot, as shown in FIGS. 3, 4, 9 and 10. As shown in FIG. 2 (a view from downwind), the wind turbine rim 22 rotates counterclockwise. Carriage 158 is on wheels 160a, b, c which permit the entire turbine wheel to pivot around an upwind pylon 11 to which the wheel boom 13 is attached (FIG. 12). The carriage both supports the wheel and takes power off the wheel by means of generator assemblies 162a, b driven by drive wheels 164a, b in contact with rim 22. This is described in more detail in my copending application above identified.

FIG. 3 illustrates the angle θ through which boom assembly 24 may pivot via control of the pay-out or uptake of line 50. Cross brace 58 is shown providing one constraint of boom assembly 24. Forestay 54 forms the other constraint of boom assembly 24 and is approximately 90° from cross brace 58. Diametral brace cable 20 forms the center line about which spindle and boom assembly 24 pivot.

In FIG. 3 the airfoil assembly is shown in two positions, a first in dashed lines where the boom is at approximately 15° from the cross brace and 75° to the wind as shown. The second position (in solid line) shows sail 18 fully luffed in the same plane as the wind. This fully luffed position is provided in the event that there is a sudden gust of wind. Line 50 can be immediately released permitting boom 24 to swing fully into (parallel to) the wind, spilling wind from the sail, thereby preventing destruction of the wind turbine 56 or airfoil assembly 10.

In FIG. 4, upper boom member 26 is curved around spindle 12 and is rotatably secured at connector 32 to diametral brace cable 20. Upper boom member 26 provides support for lower boom member 28, eyebolt 37, sheave 36 and lines 50 and 38 (see FIG. 8b), yet does not interfere with the furling or unfurling of the sail 18.

Referring now to FIG. 5, spindle 12 is shown in an exploded view connected to the gear box and hub assembly. Spindle 12 is inserted through collar 62 until holes 66a and b are aligned with collar holes 63a and b. Bolt 64 is then inserted through the aligned holes, and collar 62 is then secured to spindle 12 by nut 68. The end 70 of spindle 12 is then inserted through hole 72 in plate 44, and collar 74 is placed thereover. Bolt 76 is then inserted through collar openings 78a, b, through spindle opening 80a, b, through spacers 86a, b, and aperture 84 in drive shaft 82. Nut 88 is then threaded thereon.

Universal joint 46 is connected to drive shaft 82 by bolt 90 and nut 92. Universal drive joint 46 is then connected to a gear box 47 and motor assembly 48 (as shown in FIGS. 1 and 2) which are secured to hub bulkhead 14. The hub bulkhead 14 is approximately midway out from the pylon 11 along wheel boom 13, as best seen in FIG. 12.

The radially outermost (foot) end of spindle 12 is connected to foot plate 16 as shown in the exploded view in FIG. 6. Diametral brace cable 20 is shown connected by eyelet 94 to U-bracket 96 by bolt 98 and nut 100.

In turn the U-bracket 96 is fastened to the rim by bolt 102 which passes through rim 22, washers 104a, b being placed on each side of rim 22. Spacer 106 provides rotational clearance for foot plate 16 between it and rim 22. Bolt 102 passes through hole 108 in foot plate 16 where washers 109 permit rotation of plate 16 with respect to U-bracket 96. Nuts 112 and 116 secure bolt 102, which extends through opening 114 in u-bracket 96, to rim 22. This assembly secures diametral brace cable 20 to the rim 22 of wind turbine 56 while permitting foot plate assembly 16 to rotate.

The foot end 126 of spindle 12 is shown connected to foot plate 16 by insertion through collar 118, hole 128 and collar 132. Spindle openings 120a, b are aligned with collar openings 122a, b, and bolt 110 is passed therethrough and secured with nut 124. Spindle openings 130a, b are aligned with collar openings 134a, b such that bolt 136 may be inserted therethrough and secured with nut 138.

Lower boom member 28 is secured to foot plate 16 by means of bolts 140a, b and nuts 142a, b. Outhaul line guide 144 is connected to foot plate 16 by means of nuts 146a, b such that outhaul line 38b is strung underneath the guide and connected between reel guides 148a, b on spindle 12. One end of the outhaul line is secured to spoke 147 of the reel guide 148b.

Thus, each spindle is primarily supported at its head or centerward end in plate 44 and at its foot or peripheral end in a swivel foot plate 16, a short distance from the pivot point in connector assembly 30 of said plate. The pivot point 108 of this plate is in turn pierced by the radial anchor means of one of the wind turbine's diametral braces 20, so that the foot of the spindle may swing through a small arc about the centerline defined by the diametral brace cable. At its head end, the spindle is journalled in the same bracket fixture 44 through which the diametral brace cable passes on its way to the opposite side of the wheel's rim, and to which both the brace cable and the wheel's hub assembly are securely affixed by clamp 45.

The result is that in the embodiments of this invention wherein the foot of the spindle is now swung through the small arc defined by the distance along the swivel foot plate between the pivot point and the foot of the spindle, the movement of the spindle itself will describe a very narrow cone about the centerline of the diametral brace cable with the tip of the cone being at universal joint 46, with a slight eccentric error being introduced because of the very small distance between the actual center of the diametral brace at the hub or centerward mounting bracket. This eccentric error is nearly negligible, and can be compensated for, if needed, in the manner shown below in the description of the connector assembly 32 of FIG. 7.

Associated with each spindle is a boom assembly 24, the apex 34 of which provides a locus to which to draw the clew of the soft airfoil attached to and furled about the spindle, and which locus must remain constant in its geometric relationship to the spindle. To provide such an apex locus without interfering with the operation of the rotating spindle, a special boom 24 is provided with upper and lower members 26, 28 which converge at one end at the desired locus apex 34 and the other ends of which pivot about the same centerline (the diametral brace cable) as does the spindle.

Referring now to FIGS. 1a, 1b, 2 and 7, the pivot for the upper boom member is provided by a connector assembly 32. A crossbrace 58, disposed as a secant or chord in the plane of the wheel which may be more or less than 90 degrees to the diametral brace cable 20, is installed to intersect the diametral brace 20 at the distance radially inwardly from rim 22 which has been selected for the pivotal locus of the upper boom 26. A backstay-forestay member 52,54 is installed, which member originates adjacent the pivot end 15 of the horizontal axial boom 13 of the wind turbine (see FIG. 12), passes through the intersection of the diametral brace 20 and crossbrace 58, and continues to the distal end 17 of the horizontal axial boom 13.

As best seen in FIG. 7, a connector assembly 32, on which upper plate 150 swivels is secured by cable clamps 156a, b, c, d, e, f to the intersecting brace and stay cables 20, 52, 54 and 58 so as to prevent any movement of one brace or stay relative to any other, or of the clamp fixture 32 itself relative to any brace or stay. Since these brace and stay cables are constrained in three dimensions when interconnected by the connector 32 at their intersection, the pivotal locus for the base plate 150 of an upper boom member 26 is adequately established.

In more detail, bearing tube 157, which may be split in two halves along line 155a, b for ease of assembly on previously strung cables, is secured in position on diametral brace cable 20 by clamps 156a and 156b. Diametral clamping rods 151a and b are secured to bearing tube 157 as by welding, clamps (not shown) or other appropriate means. Likewise, crossbrace clamping rod 149 and backstay-forestay clamping rod 145 are secured to the bearing tube, and to their corresponding cables by clamps 156c, d, e and f.

The upper boom member 26 is shown in exploded view connected to upper plate 150 by means of bolts 152a, b and nuts 154a, b. Plate 150 is rotationally retained by connector assembly 32 between washers 153a, b. The crossbrace 58 is shown 90° to the plane of the forestay-backstay cables 52, 54 and to the diametral cable, while forestay 54 and backstay 52, are shown inclined approximately 35° up from the horizontal.

As best seen in FIG. 1b, should it be determined that the eccentric error introduced by the offset of the head of the spindle 12 from the diametral brace cable is troublesome, the true centerline 21 about which the spindle and boom assembly swings can be corrected to run through the center of the head end of the spindle 12 and universal 46 by adjusting the locus of the upper boom pivot point by very small distances along the forestay-backstay or crossbrace members. Compare the position of the connector 32a with 32b in FIG. 1b. Such relatively small adjustments will cause minor, negligible flexing of the diametral brace cable from original position 20a to 20b, while deflecting the true centerline 21 of the assembly so as to pass through the center of the spindle just at its extreme (centerward) head end 12 rather than straight on up the diametral brace to center cable clamp 45.

Thus, the upper boom member's pivot locus fixture, connector assembly 32, as shown in FIG. 7, may be characterized as having six fingers rigidly affixed to a bearing tube 157, about which tube an upper boom mounting plate 150 is rotatably mounted so that is may swivel freely. The crossbrace is clamped to the horizontal pair of fingers in the y-axis, the forestay-backstay, which is passed under the crossbrace, is seized to the pair of fingers which are angled upward at the approximate angles made by the forestay and backstay with the diametral brace, both lying in the plane of the Z-axis, and the diametral brace is passed through the bearing tube and seized to the vertical fingers affixed to the bearing tube in the X-axis. The base end of the upper boom member 26 is affixed to the mounting plate 150 with through-bolts 152a,b.

FIG. 8A in side view illustrates the apex 34 of upper boom member 26 and lower boom member 28. Sheet 50 is connected at one end to apex 34, and at its other end through a sheave 51 on the rim 22 of wind turbine 56 and sheave 53 at the hub to reel 55 (FIGS. 1 and 2). FIG. 8B shows a top view of apex 34 with pulley 36 and outhaul line 38 secured thereto by eyebolt 37.

Since the bend or offset of the upper boom member, which keeps it clear of the soft airfoil-carrying spindle, may be structurally undesirable, alternate structures are presented in FIGS. 9, 10, 11a and 11b. In these alternatives, the boom is straight and the spindle offset. In the top schematic view of FIG. 9 the spindle 12/sail 18 assembly is offset in foot plate 16 as shown, where the forestay can be eliminated. Both upper and lower boom members 26, 28 lie in a straight line as seen from above, and the swivel foot plate 16 is so designed that the foot of the spindle is sufficiently offset from the line of the boom members that the spindle 12 along with any sail 18 furled thereon clears the boom members. By the absence of a forestay, the spindle/sail/boom may pivot through more than 90°, thus permitting greater angular control in setting or luffing the sails in case of wide variations in wind shift.

This alternate offset arrangement of foot plate 16 and boom 24 and spindle 12 arrangement is shown in a top schematic view in FIG. 10, but in a turbine wheel assembly which includes a forestay 54. Because of the spindle offset, the spindle 12 will impinge upon the forestay 54 before the soft airfoil is 90° to the plane of rotation of tubine wheel rim 22. This offset spindle version may be useful even where its motion is limited by a forestay, since whenever the turbine is in motion, the sails will luff before the boom reaches 90°.

Under some conditions it may be desireable to replace the rigid lower boom member 28 with a cable or line. In this alternative the cable or line is secured to foot plate 16 in approximately the same fashion as the rigid lower member it replaces, and is attached to apex point 34 on upper boom member 26. It then continues to the head of the associated spindle where it is secured to plate 44 to provide another version of the V-shaped boom.

FIG. 11a shows in perspective another alternative construction. Instead of securing the lower boom member 28 to a swivel foot plate pivoted about the line of the diametral brace, the boom 28 itself may be pivoted about the axis of the diametral brace, the diametral brace cable 20 passing through hole 29 in lower boom member 28. In this construction an offset foot plate 16 having hole 128 for journaling the spindle 12 is affixed to the base end of the lower boom member.

FIG. 11b shows an offset, L-shaped upper plate 150b having a hole 159 therein through which bearing tube 157 passes, and to which upper boom member 26 is secured. In this embodiment the upper boom is straight rather than curved, the airfoil clearance being provided by the offset plate 150b. As seen in FIG. 11b, the plate 150b is bent downwardly at an angle so that upper boom 26 meets the lower boom at the apex.

FIG. 12 shows wind turbine 56 in a three-quarters perspective view, without the boom assembly of this invention, for reference to the relative positioning of the various tension braces, rigging frames, wheels, and spindle assemblies (in dashed lines) eliminated by the present invention. Rim 22 is supported on power takeoff carriage 158, and wheel boom 13 is suspended from rim 22 by cables. The boom 13, rim 22, and carriage 158 all pivot at upwind end 15 around pylon 11. The structural (tension) braces, rigging frames, traveler tracks and travelers which are eliminated are best shown in FIG. 13. Note the traveler track 260, outer rigging frames 232a, b, c and 231, structural (tension) braces 233a, b, c and traveler 261 may be supplanted by the boom 24/foot plate 16 assembly of this invention with its control lines 38, 50.

FIG. 13 illustrates the structures x described in my copending application, above-identified, which are eliminated by the soft airfoil control system of this invention. FIG. 12 shows the general orientation for illustrative purposes of one traveler track 260 and part of the outer rigging frame 232a, 232c.

It should be understood that various modifications within the scope of this invention can be made by one of ordinary skill in the art without departing from the spirit thereof. For example, the foot plate 16 could be fixed (instead of movable) in either of the positions of FIG. 3 (or intermediate thereto) and the lower boom member 28 pivotable around bracing cable 20 as in FIG. 11 (as well as upper boom member 26 remaining pivotable), thus permitting control of the sail by the boom angle to the wind. Also, if the upper boom member 26 were appropriately positioned along brace cable 20, the clew of sail 18 could be secured to a traveler or slide moving along upper boom member 26. In such event, outhaul line 38 also would be attached in order to obtain better control over a partially furled sail.

As seen in FIG. 14a, the boom 24,24' need not be pivoted only on diametral brace cable 20, but may be pivoted on a separate member 200 offset from, and preferably parallel to, the brace cable 20. Likewise both boom members may be secured to pivoting foot plate 16 so that the V-shape of the boom is canted to the horizontal as in FIG. 14b or is oriented in a plane normal to the foot plate 16 as in FIG. 14c. These structural alternatives do not require the upper boom member to be curved around the spindle 12.

Variations on the above structure are contemplated, in one embodiment, (not shown) the angular position of the boom is controlled by a linkage between an actuating mechanism (such as a line or hydrauically actuated shaft) and the foot plate. In still another embodiment (not shown) the upper boom plate 150 need not pivot around bearing tube 157, but rather a pivot assembly may be secured to one side of the tube or secured to x-axis rod 151a, b with the bearing tube being eliminated.

I claim:

1. Soft airfoil support and control assembly for a wind turbine having a wheel with an axle suspended from a rim, said axle having a hub assembly in the plane of said wheel, comprising:

(a) an elongate support member mounted in tension extending between said hub and rim;

(b) an elongate spindle mounted radially between said hub and rim in a manner minimizing longitudinal force loading thereof;

(c) said spindle carrying a soft airfoil furled thereabout;

(d) means for mounting said spindle for rotation about its elongate axis to permit furling and unfurling of said soft airfoil therefrom;

(e) means for supporting a portion of said airfoil spaced from said spindle, said support means including at least one elongate boom member disposed intermediate said rim and said hub;

(f) means for selectively changing the angular position of the boom member with respect to the plane of the wheel to control the angle of attack of said unfurled airfoil relative to wind conditions;

(g) means for mounting said boom member and said spindle to pivot in unison about a common center line spaced from the rotational axis of said spindle;

(h) said assembly cooperating to provide selective positioning of a selected amount of unfurled soft airfoil before the wind to effect rotation of said wind turbine wheel for power take-off from the rim thereof.

2. A soft airfoil assembly as in claim 1 wherein:
(a) said support member is a cable, and
(b) said boom and spindle mount means pivots about said support cable.

3. A soft airfoil assembly as in claim 2 wherein:
(a) said spindle mount means includes a foot plate member mounted for pivotal movement about said support cable adjacent said rim; and
(b) said spindle rotation mounting means is mounted to said foot plate member.

4. A soft airfoil assembly as in claim 3 wherein:
(a) the axis of rotation of said spindle is spaced farther from said support cable center line at the rim end of said spindle than at the hub end so that said spindle is canted leeward from hub to rim.

5. A soft airfoil assembly as in claim 4 wherein:
(a) said boom member includes means for pivotally mounting said boom to said cable support spaced from said footplate toward said hub; and
(b) said boom member and said footplate pivot about a common axis, the center line of which is spaced from the axis of rotation of said spindle.

6. A soft airfoil assembly as in claim 5 wherein:
(a) said boom member is a susbstantially rigid member; and
(b) said airfoil support means includes:
(i) a pulley spaced from said spindle on said boom;
(ii) a take-up reel; and
(iii) a line connected between said airfoil at its clew and said take-up reel, and supported intermediate the ends thereof by said pulley to unfurl said soft airfoil as said spindle is rotated on its axis.

7. A soft airfoil assembly as in claim 6 wherein:
(a) said reel is mounted to said spindle adjacent said footplate; and
(b) said spindle rotating means includes a motor and gearing assembly disposed in said hub adapted to simultaneously rotate a plurality of spindles disposed in a radially spaced array around said wheel.

8. A soft airfoil assembly as in clim 6 wherein:
(a) said airfoil support means includes a second member comprising a cable extending from said footplate toward said hub and is secured to the distal end of said boom spaced from said spindle.

9. A soft airfoil assembly as in claim 7 wherein:
(a) said second boom cable member extends from said boom distal end to said hub.

10. A soft airfoil assembly as in claim 6 which includes:
(a) at least one stay selected from a forestay, a backstay and a crossbrace, adjustably securable to said support cable at a point intermediate said hub and said rim to assist in minimizing lateral deflection of said support cable from a preselected orientation; and
(b) a connector assembly adjustably securable to selected ones of said stays to change the position of the axis of pivot of said boom member and said footplate.

11. A soft airfoil assembly as in claim 10 wherein:
(a) said airfoil support means inludes a second, subsstantially rigid, lower boom member;
(b) means for securing a free end of said second boom member to a free end of said first boom member at a point spaced from said spindle;
(c) means for mounting the other end of said second boom member to pivot around said support cable on a substantially common center line with said first boom member pivot axis.

12. A soft airfoil assembly as in claim 11 wherein:
(a) said footplate is secured to said lower boom member; and
(b) said lower boom member includes means for pivotally securing said lower boom member to said support cable adjacent said rim.

13. A soft airfoil assembly as in claim 11 wherein:
(a) said footplate includes means for pivotally securing said footplate to said support cable; and
(b) said lower boom member is secured to said footplate.

14. A soft airfoil assembly as in claim 13 wherein:
(a) both boom members are secured to said footplate.

15. A soft airfoil assembly as in claim 13 wherein:
(a) said connector assembly is secured to a plurality of said stays; and
(b) the position of said boom members and footplate pivot axis center line is controlled by moving the connector assembly along one or more of the forestay, backstay and crossbrace cables.

16. A soft airfoil assembly as in claim 14 wherein:
(a) the boom members and footplate pivot axis center line is adjusted to intersect the spindle axis at the hub end of the spindle.

17. A soft airfoil assembly as in claim 13 wherein:
(a) said boom members and said spindle are offset with respect to each other to provide clearance for said soft airfoil upon furling or unfurling, to permit the airfoil to be selectively positioned between being substantially parallel to the plane of rotation of said wind turbine wheel and to substantially 90° to the plane of rotation to permit said soft airfoil to luff freely.

18. A soft airfoil assembly as in claim 17 wherein:
(a) at least one of said boom members is curved around said spindle to provide said clearance.

19. A soft airfoil assembly as in claim 17 wherein:
(a) said boom angular position changing means includes a line secured to said boom at a point spaced from said spindle; and which includes:
(b) a pulley mounted on said rim;
(c) a reel mounted in said hub; and (d) said line is sheaved on said pulley and passes to said reel so that said boom angle is controlled by taking up or letting out said line.

20. A soft airfoil assembly as in claim 19 wherein:
(a) said connector assembly comprises:
 (i) a plurality of rods disposed in planes 90° with respect to each other to form extensions in each of an x-axis plane, a y-axis plane, and a z-axis plane; and
 (ii) means for clamping said rods to a plurality of said stays.

21. A soft airfoil assembly as in claim 20 wherein said connector assembly includes:
(a) a bearing tube through which said diametral brace passes.

22. A soft airfoil assembly as in claim 21 wherein:
(a) said boom member mounting means rotates around said bearing tube which is journaled in said boom mounting means.

23. A soft airfoil assembly as in claim 22 wherein:
(a) said bearing tube includes at least a pair of sections adapted to permit securing of the tube around said diametral brace cable, and
(b) said y-axis and z-axis clamping rods are secured to one or more of said sections.

24. A soft airfoil assembly as in claim 20 which includes:
(a) means for sensing wind conditions including direction and velocity; and
(b) means for selecting the angle of attack of said soft airfoil and the amount of airfoil presented to the wind in response to said wind conditions.

25. A soft airfoil assembly as in claim 24 wherein:
(a) the amount of soft airfoil unfurled from said spindle is controlled in response to said wind velocity.

26. A soft airfoil assembly as in claim 25 wherein:
(a) the angle of said boom member with respect to the plane of said wheel rotation is controlled in response to said wind direction.

27. A soft airfoil assembly as in claim 26 wherein:
(a) the angle of said boom member with respect to the plane of said wheel rotation is also controlled in response to said wind velocity.

28. A soft airfoil assembly as in claim 24 wherein:
(a) said selecting means includes a computer.

* * * * *